United States Patent [19]

Aguirre

[11] Patent Number: 4,534,799
[45] Date of Patent: Aug. 13, 1985

[54] PROCESSING AIDS FOR NATURAL AND SYNTHETIC RUBBER

[75] Inventor: Juan E. Aguirre, Hackensack, N.J.

[73] Assignee: Technical Processing Inc., Paterson, N.J.

[21] Appl. No.: 647,479

[22] Filed: Sep. 5, 1984

[51] Int. Cl.³ .................... C08L 91/00; C08K 9/04
[52] U.S. Cl. .................... 106/270; 260/503; 260/505 A; 260/505 E; 260/505 S; 260/505 N; 252/33.2; 252/40; 252/52 R; 524/158
[58] Field of Search ............ 260/503, 505 A, 505 E, 260/505 S, 505 N; 106/270; 524/158; 252/33.2, 40, 52 R

[56] References Cited

U.S. PATENT DOCUMENTS

| | | | |
|---|---|---|---|
| Re. 29,821 | 10/1978 | Aron | 524/158 |
| 3,882,062 | 5/1975 | Aron | 524/158 |
| 4,010,129 | 3/1977 | Aron | 524/159 |
| 4,046,733 | 9/1977 | Smith et al. | 524/158 |
| 4,182,702 | 1/1980 | Schwartz | 525/342 |

FOREIGN PATENT DOCUMENTS

| | | | |
|---|---|---|---|
| 2908265 | 9/1980 | Fed. Rep. of Germany | 260/505 N |
| 795383 | 5/1958 | United Kingdom | 260/505 N |
| 1002287 | 3/1983 | U.S.S.R. | 260/505 N |

Primary Examiner—Ronald W. Griffin
Attorney, Agent, or Firm—Kenyon & Kenyon

[57] ABSTRACT

A partially-neutralized, fatty-acid modified alkylbenzene sulfonic acid is useful as a processing aid for use with natural, synthetic or reclaimed rubber, and it is useful in the mastication and peptizing steps of rubber processing, as well as in dispersing and emulsifying additives for the rubber and in improving the wetting characteristics of the rubber. The partially-neutralized, fatty-acid modified sulfonic acid may be formulated into a composition having particular utility as a lubricant for rubber by mixing with a fatty acid amide, a polyethylene glycol, a wax and, optionally, a fluorinated surfactant.

9 Claims, No Drawings

PROCESSING AIDS FOR NATURAL AND SYNTHETIC RUBBER

This invention relates to improved rubber processing aids. Specifically, it relates to processing aids which are useful in the mastication, peptizing, and compounding of rubber.

BACKGROUND OF THE INVENTION

The initial step in processing rubber is the breakdown of the crude rubber into a soft, plastic state. This step, which is called the mastication step, is complicated by the fact that crude rubber is generally very high in viscosity and, therefore, is difficult to break down. In addition, the high viscosity makes it difficult to admix the many additives into the rubber during processing.

Typically, the crude rubber is placed into a mixer, such as a two-roll rubber mill or a Banbury, to perform the mastication step. During this step, the rubber is mixed with a peptizer (plasticizer) for several minutes under heat until the rubber is sufficiently softened. Then the rubber is dumped, rolled into sheets on a roll mill or a calendar machine and cooled. The rubber is then ready for further processing.

It has been known to employ an alkylaromatic sulfonic acid, e.g., dodecylbenzene sulfonic acid, as a peptizer for natural and synthetic rubbers. The use of sulfonic acid peptizers has been complicated, however, by the fact that, unless care is taken, the alkylaromatic sulfonic acid can cause excessive breakdown of the rubber, leading to a brittle product. In addition, the alkylaryl sulfonic acid is not always fully compatible with the rubber being processed.

The novel processing aid of this invention is a modified alkylbenzene sulfonic acid having improved compatibility with rubber and a more moderate peptizing action when compared with the alkylbenzene sulfonic acid alone.

The novel processing aid of the present invention can be used to reduce and/or eliminate the need for the mastication step. It can be added to the crude rubber in the mixing step and will facilitate the chemical and mechanical breakdown of the rubber, thereby reducing the need for a subsequent mastication step or the peptizer used therein.

The novel processing aid of the present invention has additional benefits as well. When added to crude rubber, it reduces the mixing time required to disperse or emulsify additives into the crude rubber. It also imparts improved physical properties to the polymer, such as improved flow, extrusion and mixing characteristics. Therefore, the composition of this invention is useful in the additive compounding step for rubber, whether the rubber requires premastication (natural rubber) or not (synthetic rubber).

Furthermore, the processing aid of the present invention improves the wetting properties of the rubber. Conventional peptizers, while they do reduce the viscosity of the rubber, do very little to improve the wetting characteristics of the rubber.

It is, therefore, an object of this invention to provide a novel processing aid that can be added to crude rubber during the mixing step which reduces and/or eliminates the need for the mastication step or the peptizer used therein.

It is a further object of this invention to provide a novel processing aid that reduces the mixing time needed to disperse additives into the rubber, that improves the physical properties of the rubber, and that enhances the rubber's wetting characteristics.

SUMMARY OF THE INVENTION

The rubber processing aid of this invention is a partially neutralized adduct or reaction product of an alkylbenzene sulfonic acid and a long chain fatty acid. This product is prepared by heating a mixture of the fatty acid, with evolution of water, and is believed to include a mixed anhydride, together with unreacted fatty acid and sulfonic acid. The reaction is represented by the formula:

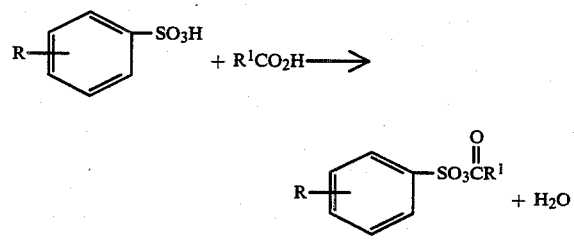

Following the reaction, unreacted acids are partially neutralized to a pH of from about 4.5 to about 6.5, depending upon the intended use of the reaction product.

The alkylaromatic sulfonic acid employed in forming the product of this invention may be represented by the formula:

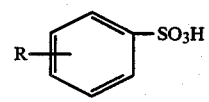

wherein R is a branched or straight chain alkyl group having from about 10 to about 14 carbon atoms. Dodecylbenzene sulfonic acid is illustrative and preferred.

The fatty acid employed in forming the product of this invention is a saturated or unsaturated long chain fatty acid, typically one having from about 14 to about 20 carbon atoms. Illustrative fatty acids include palmitic acid, oleic acid, stearic acid, myristic acid, and the like.

The fatty acid may be in pure form; however, it has been found that crude fatty acid-containing mixtures, such as wool-grease or degras, obtained from scouring of wool may be employed in accordance with this invention. Refined wool grease, such as lanolin, can also be employed provided it has sufficient free acid content, i.e., at least about 9 weight percent fatty acid. As is known, these products also include alcohols and waxes which do not interfere with the use of the resulting product as a rubber processing aid and, indeed, which impart useful properties to the processing aid. Preferred forms of wool grease, degras and lanolin are those containing from about 9 to about 30 weight percent fatty acid.

The fatty acid is employed in an amount, by weight, which is at least the amount of the sulfonic acid, i.e. the weight ratio of fatty acid to sulfonic acid is at least about 1:1. It is preferred to employ excess fatty acid to impart improved wetting properties and increased compatibility of the processing aid of this invention with rubber. Because the peptizing action of the processing aid decreases with increasing proportions of fatty acids, the ratio of fatty acid to sulfonic acid should not exceed about 3:1. A preferred ratio is about 2:1.

The fatty acid and sulfonic acid are contacted under conditions sufficient to allow the desired reaction to proceed. As a general rule, temperatures at about or slightly above the boiling point of water, e.g., from about 210° F. to about 225° F., are desired to allow removal of water formed in the reaction as a vapor. The reaction time will vary depending upon the fatty acid/sulfonic acid ratio, with higher ratios allowing shorter reaction times, and source of fatty acid, with longer times being required when crude acid sources such as wool grease and degras are employed. As an example, about one hour is required at about 210°–215° F. when pure fatty acid is used, and its ratio to sulfonic acid ratio is about 2:1. When the fatty acid source is wool grease or degras having about 20% fatty acid, a period of about 2 hours is required.

The course of the reaction can be followed by monitoring the pH of the reaction mixture, and the reaction is preferably terminated at a pH of from about 2 to about 3, and preferably at a pH of about 2.8 to about 3.

Following the reaction, the still acidic reaction mixture is cooled and partially neutralized to a pH of from about 4.5 to about 6.5. The particular pH of the partially neutralized product is dependent upon the intended end use of the product. Those products having a lower pH, e.g., a pH of from about 4.5 to about 5.5 have greater peptizing action, and thus are more suitable for use as peptizer. Those products having a higher pH, e.g., a pH of from about 5.5 to about 6.5, are less active as peptizers but do have utility as wetting agents. In particular, the latter products are of particular value as components in novel processing aid compositions described more fully below.

The neutralization can be effected in any convenient way, using inorganic or organic bases. It is preferred, however, to employ organic amines because the resulting partially neutralized product is not as viscous as a product neutralized with an inorganic base. Preferred amines are lower alkyl or hydroxy lower alkyl primary, secondary and tertiary amines, in particular, those where the alkyl group is ethyl or propyl. Hydroxyalkylamines, such as ethanolamine, triethanolamine, isopropanolamine and the like, are preferred. A mixture of amines, such as a mixture of isopropanolamine, diisopropanolamine and triisopropanolamine has been found useful.

The processing aid of this invention can be employed as such. It has been found, however, that under some conditions, charring of rubber can occur in its use if care is not taken. To reduce the chance that charring may occur, it is preferred to add to the composition an isopropyl ester of a long chain fatty acid having from about 14 to about 22 carbons. The fatty acid may be the same as or different from the fatty acid employed in the reaction with the sulfonic acid. Illustrative esters include: isopropyl myristate, isopropyl palmitate and the like. The amount of the fatty acid ester, when employed, can be as much as about 35 weight percent of the total composition, with higher amounts being used when pure fatty acids are used in the reaction with the sulfonic acid. When crude acids, such as wool grease or degras, are used, the amount of ester can be reduced, and typically is in the range of up to about 20 weight percent, and preferably is from about 10 to about 20 weight percent.

The processing aid of the present invention can be added to the crude rubber in the mixing cycle prior to the mastication step, but should be added no later than the compounding steps of the rubber processing. It may be used in liquid, powder, or paste form, and it may be admixed with other suitable materials which will facilitate the introduction of the processing aids into the polymer.

The amount of the novel composition of the present invention needed to achieve the improved processing of the rubber will vary depending upon the properties of the rubber, as well as the properties of other processing aids which may be employed in addition to the processing aid of this invention. In general, effective amounts of the processing aid of this invention are in the range of from about 0.5% to about 3%, and preferably from about 1% to about 2%, based on the total weight of the mixture of the crude rubber, the processing aid of this invention and any other compounding ingredients.

The processing aids of this invention may be illustrated by the following compositions.

|  | WT % |
|---|---|
| COMPOSITION A | |
| Wool Grease (20% Acid) | 70% |
| Dodecylbenzene Sulfonic Acid | 12% |
| Triethanolamine | 6% |
| Isopropylmyristate | 12% |
| COMPOSITION B | |
| Wool Grease (20% Acid) | 62% |
| Dodecylbenzene Sulfonic Acid | 15.5% |
| Triethanolamine | 7.75% |
| Isopropylmyristate | 14.75% |
| COMPOSITION C | |
| Degras (20% Acid) | 50% |
| Dodecylbenzene Sulfonic Acid | 22.5% |
| Isopropanolamine | 11.25% |
| Isopropylmyristate | 16.25% |
| COMPOSITION D | |
| Degras or Lanolin (20% Acid) | 70% |
| Dodecylbenzene Sulfonic Acid | 20% |
| Isopropanolamine | 10% |

The above compounds are presented to exemplify the novel partially-neutralized, fatty acid, modified, alkylbenzene sulfonic acid.

The above-described processing aids may be employed alone, or they may be employed in admixture with other materials to provide a new processing aid composition. A particularly preferred rubber processing aid composition, which is useful as a lubricant in the processing of rubber, and which includes the partially-neutralized, fatty-acid modified alkylbenzene sulfonic acid of this invention, consists essentially of:

1. A fatty acid amide;
2. A normally-solid polyethylene glycol;
3. A normally-solid, low density wax; and
4. A partially-neutralized, fatty-acid modified alkylphenyl sulfonic acid as described above.

The composition may optionally include a fluorinated surfactant, as well as fillers or solvents.

The fatty acid amide which is employed in this preferred composition is one known heretofore as a lubricant for rubber, and may be represented by the formula:

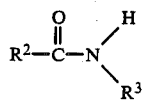

wherein $R^2$ is a straight or branched alkyl or alkenyl group having from about 8 to about 22 carbons and $R^3$ is hydrogen or a

group wherein $R^4$ is a straight or branched alkyl or alkenyl group having from about 8 to about 22 carbon atoms, and wherein $R^2$ and $R^4$ may be the same or different. Illustrative of these amides are stearamide, erucamide, oleamide, stearyl erucamide, oleyl palmitamide, erucyl stearamide and the like. Suitable amides are available from Humko Chemical Division of Witco Chemical Corp. under the designation "Kemamide", and include Kemamide S, Kemamide B, Kemamide U, Kemamide E, Kemamide E180, Kemamide E221, Kemamide P181, Kemamide S180 and Kemamide S221.

The choice of what type of amide to employ depends in part on economic considerations and in part on the intended use of the composition. In general primary amides, such as stearamide, behenamide, oleamide and erucamide, are less expensive than secondary amides such as stearyl erucamide, erucyl erucamide, oleyl palmitamide, stearyl stearmide or erucyl stearamide. On the other hand, the secondary amides are less volatile than the primary amides, and for that reason are preferred for use at more elevated temperatures, e.g., temperatures above about 150° C. which are used to process certain rubbers.

The polyethylene glycol is a normally-solid, water-soluble polyethylene oxide, which may have an average molecular weight in the range from about 50,000 to about 2,000,000. Suitable polyethylene oxides are marketed by Union Carbide Corp. under the trademark "POLYOX". Preferred ethylene oxide polymers are those having average molecular weights in the range of from about 100,000 to about 1,000,000, such as POLYOX WSR-N3000, POLYOX WSR-N80, POLYOX WSR-N3333 and POLYOX WSR-N12X.

The wax employed in the lubricant of the invention can be a synthetic or natural wax. Synthetic waxes which may be employed are low density, low molecular weight and low crystalline polyolefin waxes. Preferred polyolefin waxes are polyethylene waxes having a density of from about 0.9 to about 0.93 gm/cm$^2$, a viscosity of from about 40 to about 500 centipoise (at 140° C.—Brookfield), and a melting point of from about 90° C. to about 110° C., and preferably from about 100° C. to about 102° C. Suitable polyethylene waxes are available from Allied Corporation under the designation "A-C Polyolefins", and include products designated AC 617, AC 617A, AC 6, AC 6A, AC 7, AC 7A, AC 8, AC 8A, AC 9, AC 9A, AC 712, AC 715, AC 725 and AC 735. Olefin copolymers (e.g., copolymers of ethylene with vinyl monomers such as vinyl acetate, acrylates such as methyl methacrylate and ethyl acrylate, and carboxylic acids such as acrylic acid) may be employed in place of or in addition to the polyethylene wax.

Natural waxes which may be employed are those having melting points in the range of from about 45° C. to about 90° C., and include montan wax, paraffin wax, beeswax, lanolin wax and the like.

It is particularly preferred to employ a combination of a polyethylene wax with a natural wax, e.g., lanolin wax. In such a case, the amount of the natural wax should not exceed the amount of the polyethylene wax. When the partially-neutralized, fatty-acid modified alkylbenzene sulfonic acid of this invention is derived from a wax-containing crude fatty acid, e.g., wool grease or degras, the wax present in the crude fatty acid may provide some or all of the natural wax content.

The fourth ingredient of the lubricant composition is the partially-neutralized, fatty-acid modified alkylbenzene sulfonic acid of this invention. It is preferred, however, that the pH of the modified sulfonic acid be above about 6, and preferably be from about 6.3 to about 6.5.

As is noted above, it may be desirable to include in the lubricant composition of this invention a fluorinated surfactant. Such surfactants are understood to include aliphatic fluorocarbon chains, e.g., chains of the formula $-C_nF_{2n+1}$, which impart reduced surface tension and improved wetting characteristics. Such surfactants are available from E. I. duPont deNemours & Co., Inc. under the trademark "ZONYL", and include anionic surfactants such as Zonyl FSA, Zonyl FSP and Zonyl FSJ; cationic surfactants such as Zonyl FSC; nonionic surfactants such as Zonyl FSN and Zonyl FSO; and amphoteric surfactants such as Zonyl FSP. Other fluorosurfactants are available from 3M Company under the trademark "Fluorad", including Fluorad FC-128, a potassium fluorinated alkyl carboxylate, Fluorad FC-34, a fluorinated quaternary ammonium iodide; Fluorad FC-170, a nonionic fluorinated alkyl polyoxyethylene ethanol, and Fluorad FC-432, a nonionic fluorinated alkyl ester. The non-ionic fluorosurfactants are preferred.

In addition to the above active components, the processing aids of the present invention can contain an inert filler and/or carrier. Suitable fillers are many and varied, and include diatomite or fullers earth, various clays, calcium carbonate, talc, aluminum trihydrate, kaolin, silica, shell flour, bentonite, silicon dioxide and the like.

These compositions are normally in powder form, but they may be formulated into a liquid or paste form through the addition of such solvents as tripropylene glycol, isopropylmyristate, polypropylene glycol, liquid fatty acid amides and the like. In general, if the solvent content of the final composition exceeds about 50 weight percent, the composition will be a liquid lubricant. In order to produce a paste, a lesser amount of these solvents may be used. Alternatively, and preferably, petrolatum may be employed in the composition to yield a paste form.

The lubricant composition of this invention may be added to crude rubber in the mixing cycle prior to the mastication step but should be added no later than the compounding steps of the rubber processing. The amount of lubricant of the present invention needed to achieve the improved processing or release of the rubber compounds ordinarily is from about 0.5% to about 2% based on the total weight of the rubber, lubricant mixture, and other compound ingredients.

Some of the components of the lubricant composition have been used alone as processing aids, but combination of the components in accordance with the present invention yields a composition that plasticizes, peptizes and improves the compounding and release of crude rubber all at the same time.

For example, amides have been employed in the past as release agents, but they suffer from a compatibility problem in that they are not compatible with all elastomers. When the amides are admixed with the polyethylene wax, however, the resulting composition is compatible with some of those elastomers with which the amides alone are not compatible. It is believed that the release qualities of the present invention are obtained because the amide and polyethylene migrate to the rubber surface during molding. Since the amide and polyethylene migrate at different rates, depending upon the temperature, combining both of them increases the temperature range over which the present invention will operate as a release agent.

The surfactants and the polyethylene oxide are included in the novel lubricants of the present invention to enhance the plasticization of the crude rubber. These components improve the mechanical slip of the rubber molecules, causing the crude rubber to soften more quickly. In addition, these components aid in the compounding step of the rubber process. Any compounding agents added to a crude rubber containing the present lubricants can be dispersed more quickly and more homogenously into the crude rubber.

The partially-neutralized, fatty-acid modified alkylbenzene sulfonic acid aids in chemical break down of the molecular bonds in the rubber. When the source of the fatty acid is wool grease or degras, the waxes present in the modified product may substitute for some of the amides or polyethylene, because they enhance the release qualities of the rubber in a fashion similar to the amides and polyethylenes. The substitution of the natural waxes for the polyethylene wax will cause little change in the releasing ability of the present lubricants.

Lastly, the inert fillers are added to facilitate the introduction of the lubricant into the crude rubber or elastomer.

The preceding theory is offered solely by way of explanation and it is not intended that the invention be limited to this theory.

When the novel lubricants of the present invention are desired in a powder form, all the powder components are combined in a dry blend mixer, such as a ribbon blender, and mixed until evenly dispersed. If the lubricant is desired in a liquid form, the solvent and waxes (if required) are then added and the entire mixture is agitated until a homogeneous liquid mixture is produced. To facilitate their addition, the waxes are typically melted before being introduced to the mixture.

If a lubricant in paste form is desired, petrolatum is used in place of most of the other waxes and the fillers. The petrolatum is charged to a suitable mixer and heated to 190° F. but not over 230° F. The remaining components are then added one by one starting with the materials having the highest melting point. The entire mixture is then agitated until a homogeneous mixture is produced. The mixture is then allowed to cool.

The amounts of the various ingredients in the lubricant composition will vary depending upon the properties of the individual ingredients, and the properties desired in the lubricant composition. In general, however, the proportions, exclusive of inert fillers and/or carriers, will be in the following ranges:

| Component | Proportion Weight Percent |
| --- | --- |
| Fatty acid amide | 5–50 |
| Polyethylene glycol | 0.5–10 |
| Polyethylene wax | 2–50 |
| Natural wax | 0–20 |
| Partially-neutralized, modified alkylbenzene sulfonic acid | 2–20 |

When a fluorinated surfactant is employed, it preferably is present in amounts of from about 0.05 to about 5 weight percent. The amount of inert filler and/or carrier, when employed, ordinarily will be in the range of from about 10 to about 40 weight percent.

Typical lubricant compositions are as follows:

| | WT % |
| --- | --- |
| LUBRICANT COMPOSITION E | |
| Clay | 36.0% |
| Stearamide | 22.0% |
| Polyethylene wax (AC 617A) | 10.0% |
| Modified dodecylbenzene sulfonic acid (Composition B) | 12.0% |
| Lanolin wax | 6.0% |
| Petrolatum | 10.0% |
| Ethylene oxide polymer (POLYOX N3000) | 3.0% |
| LUBRICANT COMPOSITION F | |
| Attapulgus clay | 13.0% |
| Stearamide | 35.0% |
| Polyethylene wax (AC 617A) | 22.0% |
| Modified dodecylbenzenesulfonic acid (Composition D) | 10.0% |
| Nonionic fluorinated surfactant (Zonyl FSN) | 2.0% |
| Ethylene oxide polymer (POLYOX N3000) | 5.0% |
| Lanolin wax | 5.0% |
| Petrolatum | 8.0% |
| LUBRICANT COMPOSITION G | |
| Attapulgus clay | 25.0% |
| Ethylene oxide polymer (POLYOX N3000) | 5.0% |
| Stearamide | 32.0% |
| Polyethylene wax (AC 617A) | 22.0% |
| Modified dodecylbenzene sulfonic acid (Composition D) | 10.0% |
| Nonionic fluorinated surfactant (Zonyl FSN) | 3.0% |
| Lanolin wax | 3.0% |
| LUBRICANT COMPOSITION H | |
| Hard clay | 10.0% |
| Soft clay | 5.0% |
| Silicon dioxide | 3.0% |
| Ethylene oxide polymer (POLYOX N3000) | 5.0% |
| Stearamide | 32.0% |
| Polyethylene wax (AC 617A) | 24.0% |
| Modified dodecylbenzene sulfonic acid (Composition A)) | 12.5% |
| Nonionic fluorinated surfactant (Zonyl FSN) | 3.5% |
| Lanolin wax | 5.0% |
| LUBRICANT COMPOSITION I | |
| Bentonite | 7.0% |
| Attapulgus clay | 20.0% |
| Oleamide | 32.0% |
| Ethylene oxide polymer (POLYOX N3000) | 3.0% |
| Polyethylene wax (AC 617A) | 22.0% |
| Modified dodecylbenzene sulfonic acid (Composition D) | 10.0% |
| Nonionic fluorinated surfactant (Zonyl FSC) | 3.0% |
| Lanolin wax | 3.0% |
| LUBRICANT COMPOSITION J | |
| Kaolin/Bentonite (50/50 blend) | 36.0% |

| | WT % |
|---|---|
| Ethylene oxide polymer (POLYOX N3000) | 3.0% |
| Stearamide | 22.0% |
| Polyethylene wax (AC 617A) | 10.0% |
| Modified docecylbenzene sulfonic acid (Composition C) | 10.875% |
| Nonionic fluorinated surfactant (Zonyl FSN) | 0.125% |
| Lanolin wax | 3.0% |
| Stearic acid | 6.0% |
| Petrolatum | 9.0% |
| LUBRICANT COMPOSITION K | |
| Petrolatum | 41.0% |
| Ethylene oxide polymer (POLYOX N3000) | 4.80% |
| Stearamide | 9.60% |
| Polyethylene wax (AC 617A) | 17.30% |
| Modified docecylbenzene sulfonic acid (Composition B) | 17.30% |
| Nonionic fluorinated surfactant (Zonyl FSN) | 3.0% |
| Lanolin wax | 2.0% |
| Tripropylene glycol | 5.0% |
| LUBRICANT COMPOSITION L | |
| Petrolatum | 9.0% |
| Ethylene oxide polymer (POLYOX N3000) | 3.0% |
| Di-diethanol ethyl amino adipate | 30.0% |
| Stearamide | 10.0% |
| Polyethylene wax (AC 617A) | 15.0% |
| Modified dodecylbenzene sulfonic acid (Composition A) | 15.0% |
| Tripropylene glycol | 5.0% |
| Lanolin wax | 3.0% |
| Nonionic fluorinated surfactant (Zonyl FSN) | 3.5% |
| Stearic acid | 6.5% |

The above compounds are presented to exemplify the novel internal mold lubricants of the present invention and are not intended to limit the invention.

What is claimed is:

1. A partially-neutralized, fatty-acid modified alkylbenzene sulfonic acid useful as a rubber processing aid produced by heating at an elevated temperature an alkylbenzene sulfonic acid whose alkyl group contains from about 10 to about 14 carbon atoms with a saturated or unsaturated long chain fatty acid having from about 14 to about 20 carbon atoms in a weight ratio of fatty acid to sulfonic acid of at least about 1:1 until the pH of the resulting mixture is from about 2 to about 3, and thereafter adding base to adjust the pH of the mixture to from about 4.5 to about 6.5.

2. A partially-neutralized, fatty-acid modified alkylbenzene sulfonic acid according to claim 1 wherein:
   (a) The alkylbenzene sulfonic acid is dodecylbenzene sulfonic acid;
   (b) The fatty acid is in the form of a crude fatty acid-containing mixture having from about 9 to about 22 weight percent fatty acid;
   (c) The ratio of fatty acid to sulfonic acid is from about 1:1 to about 3:1; and
   (d) The base is a lower alkyl or hydroxy lower alkyl primary, secondary or tertiary amine.

3. A partially-neutralized, fatty-acid modified alkylbenzene sulfonic acid according to claim 1 wherein:
   (a) The alkylbenzene sulfonic acid is dodecylbenzene sulfonic acid;
   (b) The fatty acid is in the form of wool grease or degras containing from about 9 to about 22 weight percent fatty acid;
   (c) The ratio of fatty acid to sulfonic acid is from about 1:1 to about 3:1; and
   (d) The base is ethanol amine, diethanol amine, triethanol amine, isopropanol amine, diisopropanol amine, triisopropanol amine or mixtures thereof.

4. A rubber processing composition including a product of claims 1, 2 or 3 also including an isopropyl ester of a long chain fatty acid having from about 14 to about 22 carbon atoms, in an amount of up to about 35 weight percent.

5. A composition according to claim 4 wherein said isopropyl ester is isopropyl myristate present in an amount of from about 10 to about 20 weight percent.

6. A lubricant composition consisting essentially of:
   (a) From about 5 to about 50 weight percent of a fatty acid amide represented by the formula:

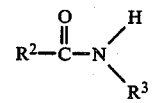

wherein $R^2$ is a straight or branched chain alkyl or alkenyl group having from about 8 to about 22 carbon atoms, and $R^3$ is hydrogen or a

group wherein $R^4$ is a straight or branched chain alkyl or alkenyl group having from about 8 to 22 carbon atoms;
   (b) From about 0.5 to about 10 weight percent of a normally-solid, water soluble polyethylene oxide having an average molecular weight of from about 50,000 to about 2,000,000;
   (c) From about 2 to about 50 weight percent of a polyolefin wax having a melting point of from about 90° C. to about 110° C.;
   (d) Up to about 20 weight percent of a natural wax having a melting point of from about 45° C. to about 90° C.; and
   (e) From about 2 to about 20 weight percent of a partially-neutralized, modified sulfonic acid according to claim 1.

7. A composition according to claim 6, also including from about 0.05 to about 5 weight percent of a fluorinated surfactant.

8. A composition according to claim 6 wherein:
   (a) The fatty acid amide is stearamide, erucamide, oleamide, stearyl erucamide, oleyl palmitamide, erucyl stearamide, erucyl erucamide, stearyl stearamide, or mixtures thereof;
   (b) The polyethylene oxide has an average molecular weight of from about 100,000 to about 1,000,000;
   (c) The polyolefin wax is a polyethylene wax having a density of from about 0.9 to about 0.93 and a viscosity of from about 40 to about 500 centipoise (at 140° C.—Brookfield); and
   (d) The modified sulfonic acid has a pH of from about 6.3 to about 6.5.

9. A composition according to claim 8 which also includes a non-ionic fluorinated surfactant in an amount of from about 0.05 to about 5 weight percent.

* * * * *